(12) United States Patent
Humphreys et al.

(10) Patent No.: US 11,813,703 B2
(45) Date of Patent: Nov. 14, 2023

(54) ON DEMAND THREE DIMENSIONAL ROOF SYSTEM MANUFACTURING

(71) Applicant: TAMKO Building Products LLC, Galena, KS (US)

(72) Inventors: David C. Humphreys, Galena, KS (US); Chris Freeborg, Irving, TX (US)

(73) Assignee: TAMKO Building Products LLC, Galena, KS (US)

( * ) Notice: Subject to any disclaimer, the term of this patent is extended or adjusted under 35 U.S.C. 154(b) by 382 days.

(21) Appl. No.: 16/879,539

(22) Filed: May 20, 2020

(65) Prior Publication Data

US 2020/0376581 A1    Dec. 3, 2020

Related U.S. Application Data

(60) Provisional application No. 62/853,987, filed on May 29, 2019.

(51) Int. Cl.

| | |
|---|---|
| *B23K 9/04* | (2006.01) |
| *E04D 1/18* | (2006.01) |
| *B23K 9/00* | (2006.01) |
| *B23K 9/12* | (2006.01) |
| *B33Y 10/00* | (2015.01) |

(Continued)

(52) U.S. Cl.
CPC ............. *B23K 9/042* (2013.01); *B22F 10/12* (2021.01); *B22F 10/22* (2021.01); *B22F 10/25* (2021.01); *B22F 10/62* (2021.01); *B23K 9/0035* (2013.01); *B23K 9/0953* (2013.01); *B23K 9/12* (2013.01); *B33Y 10/00* (2014.12); *B33Y 30/00* (2014.12); *B33Y 40/20* (2020.01);
*B33Y 80/00* (2014.12); *E04D 1/18* (2013.01); *B22F 10/28* (2021.01); *B22F 12/84* (2021.01); *B22F 12/88* (2021.01)

(58) Field of Classification Search
CPC ........ E04D 1/18; B23K 9/042; B23K 9/0953; B23K 9/0035; B23K 2103/04; B23K 9/12; B22F 10/12; B22F 10/22; B22F 10/25; B22F 10/28; B22F 10/62; B22F 12/84; B22F 12/88; B33Y 10/00; B33Y 30/00; B33Y 40/20; B33Y 80/00; C12Q 1/6886; C12Q 2600/154; C23C 24/106; C23C 4/06; C23C 4/131; Y02P 10/25
USPC ...................................... 219/76.14
See application file for complete search history.

(56) References Cited

U.S. PATENT DOCUMENTS

| | | | | |
|---|---|---|---|---|
| 4,028,450 | A | * | 6/1977 | Gould ..................... E04D 3/351 264/46.7 |
| 5,495,654 | A | * | 3/1996 | Goodhart ............. E04D 1/2916 52/529 |

(Continued)

*Primary Examiner* — Nathaniel E Wiehe
*Assistant Examiner* — Ket D Dang
(74) *Attorney, Agent, or Firm* — Cochran Freund & Young LLC; William W. Cochran

(57) ABSTRACT

Disclosed is an additive manufacturing process for making shingles and roof tiles. The entire shingle, including the substrate, can be manufactured on location, or a substrate can be manufactured at a manufacturing plant and then colored and textured on location to provide a wide variety of shapes and colors of shingles and roof tiles. Costs for inventory and shipping are reduced and a greater variety of shapes and colors can be provided for the shingles and roof tiles. The additive manufacturing equipment can be mounted on a truck so that the additive manufacturing techniques can be a mobile application of the additive manufacturing technology.

9 Claims, 4 Drawing Sheets

(51) Int. Cl.

| | |
|---|---|
| *B33Y 80/00* | (2015.01) |
| *B33Y 30/00* | (2015.01) |
| *B33Y 40/20* | (2020.01) |
| *B23K 9/095* | (2006.01) |
| *B22F 10/12* | (2021.01) |
| *B22F 10/22* | (2021.01) |
| *B22F 10/25* | (2021.01) |
| *B22F 10/62* | (2021.01) |
| *B22F 10/28* | (2021.01) |
| *B22F 12/84* | (2021.01) |
| *B22F 12/88* | (2021.01) |

(56) References Cited

U.S. PATENT DOCUMENTS

| | | | |
|---|---|---|---|
| 9,604,406 B2 | 3/2017 | Mahdavi et al. | |
| 9,623,578 B1 | 4/2017 | Aminpour et al. | |
| 9,656,428 B2 | 5/2017 | Voris et al. | |
| 2009/0117329 A1* | 5/2009 | Leitch | E04D 5/02 |
| | | | 427/213 |
| 2015/0059408 A1* | 3/2015 | Abushaev | B33Y 10/00 |
| | | | 65/181 |
| 2015/0343704 A1 | 12/2015 | Stahl et al. | |
| 2019/0009472 A1* | 1/2019 | Mark | B33Y 10/00 |
| 2019/0047069 A1* | 2/2019 | Weeks | B23K 9/04 |
| 2019/0217534 A1* | 7/2019 | Verboomen | B29C 64/129 |
| 2021/0299942 A1* | 9/2021 | Sievers | B33Y 30/00 |

\* cited by examiner

ON DEMAND THREE DIMENSIONAL ROOF SYSTEM MANUFACTURING

BACKGROUND OF THE INVENTION

Additive manufacturing, which includes 3D printing, direct digital manufacturing, and free form fabrication, is a process that creates three dimensional objects in which layers of material are formed under computer control of an additive manufacturing device. Additive manufacturing has provided a way of rapidly forming prototypes. A significant amount of research is being conducted to adapt various types of additive manufacturing to full-scale manufacturing processes for a wide range of industries. Numerous different types of additive manufacturing have been developed. These include fuse deposition modeling (FDM), laser sintering techniques, selective laser melting, electron beam melting, powder bed systems, laser powder injection systems, free form fabrication systems, which are used in metal fabrication, ink jet 3D printing, photopolymerization, which produces a solid object from a liquid, synthetic resins that are solidified using LEDs and various other techniques.

SUMMARY OF THE INVENTION

An embodiment of the present invention may therefore comprise a method of manufacturing metal shingles on a mobile platform comprising: controlling the movement of a robotic arm using signals generated by a controller; attaching a wire feed arc welder to the robotic arm having a welding tip that dispenses wire that is welded to wire previously dispensed by the welding tip; controlling the tip of the wire feed arc welder to construct a metal shingle substrate on a fabrication table from the wire dispensed by the welding tip; controlling the tip of the wire feed arc welder to construct a selected surface contour of metal shingle substrate to create a metal shingle; mounting the robotic arm, the wire feed arc welder and a controller on the mobile platform.

An embodiment of the present invention may further comprise a system for manufacturing metal shingles on a mobile platform comprising: a robotic arm; a wire feed arc welder mounted on the robotic arm having a welding tip that dispensed wire that is arc welded to wire previously dispensed by the welding tip; a controller that controls movement of the robotic arm so that the welding tip constructs a metal shingle substrate, and welds a selected surface contour on the metal shingle substrate to create a metal shingle; a mobile platform on which the robotic arm, the wire feed arc welder and the controller is mounted.

An embodiment of the present invention may further comprise a method of making shingles and roof tiles using additive manufacturing techniques comprising: coating a substrate with a desired color coating; using a light source to cure the color coating; applying a texture to the color coating; using a light source to cure the texture.

An embodiment of the present invention may further comprise a system for making shingles and roof tiles using additive manufacturing techniques comprising: a color applicator that applies a color layer to a substrate; a source of light that cures the color layer; a texture applicator that applies texture to the color layer; an additional source of light energy that cures the texture.

DETAILED DESCRIPTION OF THE EMBODIMENTS

Figure 1:
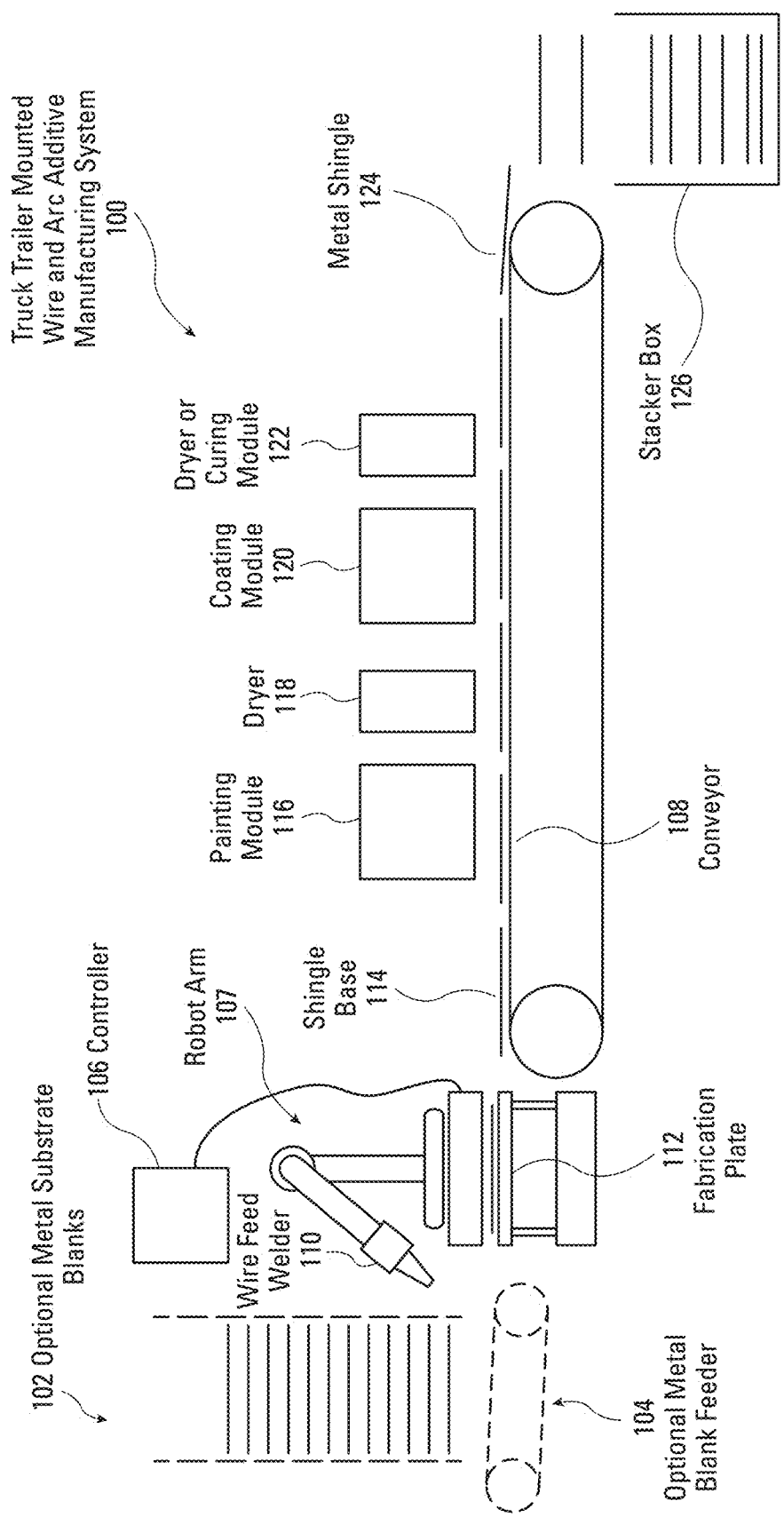
FIG. 1 is a schematic illustration of a WAAM manufacturing system.

The present application includes descriptions of both metallic additive manufacturing systems and polymeric additive manufacturing systems, which can both be used to manufacture shingles. It would be advantageous to be able to manufacture both metallic and plastic shingles on site at a building location and to the specifications of the buyer. This, correspondingly reduces transportation costs, inventory costs, and eliminates just-in-time manufacturing modeling for large manufacturing plants. At the same time, additive manufacturing systems that can be used on site must compete with the economies of scale that are realized by large, centralized manufacturing facilities. Reduction in transportation costs and inventory costs can assist in that goal, as long as the additive manufacturing system is sufficiently economical and sufficiently rapid to supply the products as needed.

Metallic additive manufacturing systems typically comprise powder bed systems, powder feed systems and wire feed systems. In powder bed systems and powder feed systems, the heat source is typically an electronic beam or a laser beam that is controlled by a computer system. Fuse deposition modeling (FDM), laser sintering manufacturing (LSM), selective laser melting and electron beam melting can be used for these systems. Powder bed systems are created by depositing powder across the work area. An electron beam or laser beam is programmed to deliver energy onto the surface of the bed and melting or sintering the powder into a desired shape. Additional powder is deposited across the work area and the process is repeated to create a 3-dimensional component. Each of the layers is approximately 50 microns thick. The advantages of this type of system are that the thin layers produce high resolution features and maintain dimensional control with high resolution. These processes are normally used for small parts that are less than a few inches in each direction. Because the layers are only 50 microns deep, many passes are required to create the product. Generic powder bed systems are not suitable for large products, such as a metal shingle which may be 40 inches across.

Powder feed systems can create larger components. In powder feed systems, the powder is conveyed to a nozzle at specific locations and depths on the build surface. A laser is used to melt the deposited metal powder to form the desired shape. This process is repeated to create a solid 3-dimensional component. Larger build volumes can be created using powder feed systems, but again, the process is slow since multiple passes must be used as a result of the thin depth of the amount of powder that is used for each layer.

Metal deposition techniques, which include the powder bed system and the powder feed system, disclosed above, can be used to make shingles. In a powder bed system, metal shingles can be printed on desktop metal deposition printers at a rate that allows for production of one shingle approximately every three to ten minutes. Using a number of these metal printing devices, multiple shingles can be produced in a timely manner at an on-site location. Such printers are available from Desktop Metal, Inc., located at 63 3$^{rd}$ Ave, Burlington, MA 01803. Although the current printers of Desktop Metal, Inc. would result in a metal shingle that is much smaller than a standard size shingle, the shingles could be printed in sections and then combined on the roof to present a desired appearance. The Desktop Metal, Inc. production system uses a Single Pass Jetting (SPJ) process that delivers up to 8,200 cm$^3$/hour. This is significantly better than any laser-based system. Low cost metal injection molding powder is used in a high throughput system that uses a simple post-processing system to deliver parts at competitive prices and high speeds. These manufacturing processes can also be used to produce a metal substrate that can then be covered by a color layer and/or a texture layer, in the manner disclosed above. The process of forming a substrate can comprise printing a metal substrate using the desktop metal printing process, i.e., a powder bed system or powder feed system. The metal substrate can then be passed to the color layer in which a photo polymer of the desired color can be placed on the metal shingle. Texture can then be added on top of the color layer, as explained above. In these ways, the use of the metal printing technology and the additive manufacturing process can both be used to produce shingles on site with desired colors and textures.

The Desktop Metal, Inc. printing system uses two powder spreaders and a single printer that pass over the build area and print in both directions, i.e., is bidirectional. The single pass system uses a powder deposition technique that deposits metal injection molding powder, which is compacted by a compacting bar. Each layer is approximately fifty microns. A print bar follows the deposition bar and deposits droplets of a binding agent which form high resolution layers. Anti-sintering agents are then placed over the areas where the droplets were deposited to simplify and shorten the post processing procedure. The layer is then dried. The parts are sintered in a microwave enhanced sintering oven to produce solid metal parts.

Wire feed systems use a wire as the heat stock, and the energy source can include an electron beam, a laser beam or a plasma arc. Wire feed systems, such as MIG welders, are well suited for high deposition rate processing and are capable of building large pieces. The resolution of the fabricated product is not as high as the powder bed or powder feed systems. But typically, extremely high resolution is not required for metal shingles. As long as the metal shingle has proper dimensions and locking channels that are of the proper dimensions, greater resolution is not required. Wire feed systems have sufficient resolutions to provide a sufficient amount of resolution for shingles.

A specific type of wire feed system is the wire+arc additive manufacturing (WAAM) process. WAAM can be used to create metal shingles, such as the MetalWorks shingles sold by TAMKO Building Products, LLC. Typically shingles, such as the MetalWorks shingles, are fabricated from galvanized steel. Other materials, including aluminum and other materials, can be used in a wire+arc additive manufacturing (WAAM) process. High deposition rates, low material and equipment costs and good structural integrity can be provided by the wire+arc additive manufacturing (WAAM) techniques. Wire+arc additive manufacturing (WAAM) reduces material waste, provides the ability to produce these products on site, and reduces time to market and installation. In addition, customization on site can be provided. For example, MetalWorks steel shingles have three standard surface contours including a slate contour, a tile contour and a wood contour. Each of these contours, and many other contours, can be easily fabricated using the computer controlled wire+arc additive manufacturing (WAAM) process. Further, the MetalWorks shingles come in eight different colors. Painting of the metal shingles can occur on site as well as coating galvanized steel with a polymer such as a Fluoropan coating, which is an air hardened PTFE coating. Fluoropan is available from Klueber Lubrication Munchen, Gmunderstrabe 50, 813 79 Munchen, Germany.

An advantage of using wire+arc additive manufacturing (WAAM) is that standard, off the shelf welding equipment, such as a standard welding power source, torches and wire heating systems can be used. Systems can be controlled by robotic systems such as an ABB 6 Axis robotic arm system or computer numerical controlled gantries. Welders which use a wire feed are a preferred process in which the wire is the consumable electrode. The coaxiallity of wire feed welders with the welding arc results in easier control of the tool path. Fronius cold metal transfer (CMT) is a modified MIG welding process, which relies on controlled transfer mechanisms that provide heat with excellent quality low thermal heat input and very low spatter when used with steel or aluminum. Fronius CMT also has a high deposition rate.

The depth of the layers that can be achieved using the wire and arc additive manufacturing (WAAM) techniques is in the range of 1-2 millimeters. This can result in a roughness or waviness of approximately 500 microns for single track deposits. Variations in height or waviness of 500 microns is acceptable for metal shingles, since the texture of the metal shingles includes height variations such as wood grains, slate contours and tile surfaces. The advantages of the fast deposition rates and thicknesses of 1-2 millimeters for each layer greatly outweigh any lack of resolution in the thicknesses created.

The cost for a 6 axis robot, a power source, a torch and the positioning tooling is inexpensive since these are off the shelf tools. Hence, the fixed costs are extremely low and these tools, as well as the materials, can be mounted on a standard truck trailer that can be transported to a work site for fabrication of metal shingles.

FIG. 1 is a schematic illustration of the truck trailer mounted system for fabricating metal shingles using a wire+arc additive manufacturing (WAAM) system. As illustrated in FIG. 1, a robot arm 107 having a wire feed welder 110, such as a Fronius cold metal transfer (CMT) wire feed welder, can be used. The robot arm 107 is controlled by a controller 106. The robot arm 107 deposits a 1-2 millimeter thick layer on the fabrication plate 112. Several layers are deposited to form the thickness of a metal shingle. The controller 106 controls the robot arm 107 so that the desired texture on the top layer of the shingle is provided. The fabrication plate 112 then releases the shingle base 114 from the fabrication plate 112 onto the conveyer 108. The shingle base 114 is then moved by the conveyer 108 to a painting module 116. The desired color is painted onto the shingle base 114. Once the shingle base 114 has been painted, the conveyer 108 moves the shingle base 114 to a dryer 118, which dries the paint. The painted shingle base is then moved by the conveyer 108 to a coating module 120. The coating module 120 may provide a durable coating that covers the paint and prevents chipping. This may comprise a PTFE coating that protects the paint layer. The painted and coated shingle base is then moved to dryer 122, which dries the coating to create the metal shingle 124. The metal shingle 124 is moved from the conveyer 108 into the stacker box 126. All of these components can easily fit on a truck trailer so that a mobile system can be provided to build these shingles on site to the buyer's specification.

Alternatively, a metal substrate blanks 102 can be provided and placed on the fabrication plate 112. An optional metal substrate blank feeder 104 can be used to move the metal substrate blanks to fabrication plate 112. The wire feed welder 110 can simply place the textured layer over the metal substrate blank 102 to further increase the speed at which the metal shingles 124 can be produced.

Of the various types of additive manufacturing that currently exist, photopolymerization is another option for making shingles from plastic. Plastic shingles can utilize photopolymers in powder or liquid form that can be cured using light from LEDs or other sources of light. Of course, other techniques can be used, such as chemical curing. For example, epoxy and a hardener can be mixed so that chemical curing occurs over time. The advantage of using photopolymers is that curing can occur very quickly and the finished product can be made in a rapid manner.

Figure 2:
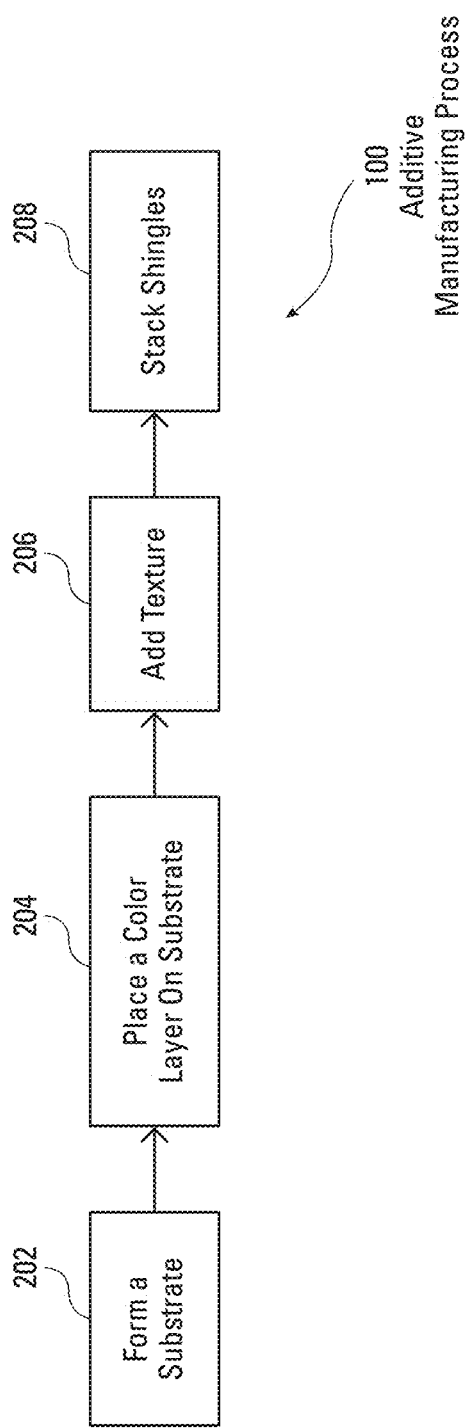
FIG. 2 is a schematic block diagram showing an embodiment of an additive manufacturing process for producing polymeric shingles and roof tiles.

FIG. 2 is a schematic block diagram illustrating an additive manufacturing process 200 for manufacturing polymeric shingles and roof tiles. Additive manufacturing is a convenient technique for creating products at or near a construction site. Additive manufacturing eliminates the need for large inventories which must be kept to meet demand. Additive manufacturing can provide a localized source of goods, in this case shingles or tiles, that have the characteristics desired by the customer. For example, a particular style and color of a shingle can be manufactured on location and there is no need to create a large inventory of various styles and colors which must be shipped to the construction site. As such, a much larger variety of styles and colors of shingles can be provided and the cost of maintaining an inventory can be negligible. Extensive studies have been made and there is a great amount of expertise in just-in-time (JIT) manufacturing. On location additive manufacturing can be considered to be the ultimate just-in-time manufacturing technique.

As illustrated in FIG. 2, a substrate is formed at step 202. The substrate may comprise of photopolymer that is cured with light. After the substrate is cured, a color layer is placed on the substrate at step 204. Normally the substrate is made from a material that is less expensive and has no particular color, or a color that may not be suitable for use as a shingle. Consequently, a color layer may be needed to provide a color that is desired by the consumer. The color layer can comprise an additional photopolymer that includes a color additive or may simply be a paint or dye layer that is used to paint or dye the substrate. Further, the substrate may simply be a pre-constructed substrate from a factory. In that case, the substrate can be constructed very inexpensively using any desired process for creating any desired type of inexpensive substrate. For example, the substrate may comprise an epoxy fiber glass substrate, a polyester substrate coated with one or more polymers or other polymer substrates, or other substrates that are commonly used in roofing materials. Although shipping costs may be involved in fabricating the substrate at a different location, all of the advantages of customizing the shingle or roof tile remains since both color and texture can be added locally.

At step 206 of FIG. 2, a texture is added to the colorized shingle or tile. For example, a relief texture or a texture that resembles granules on shingles can be added to the surface of the colorized shingle. Again, a liquid or a powder photopolymer can be constructed on the shingle using lights such as LED lights, or lasers. Once the texture has been placed on the shingles, the shingles are stacked at step 208.

Figure 3:
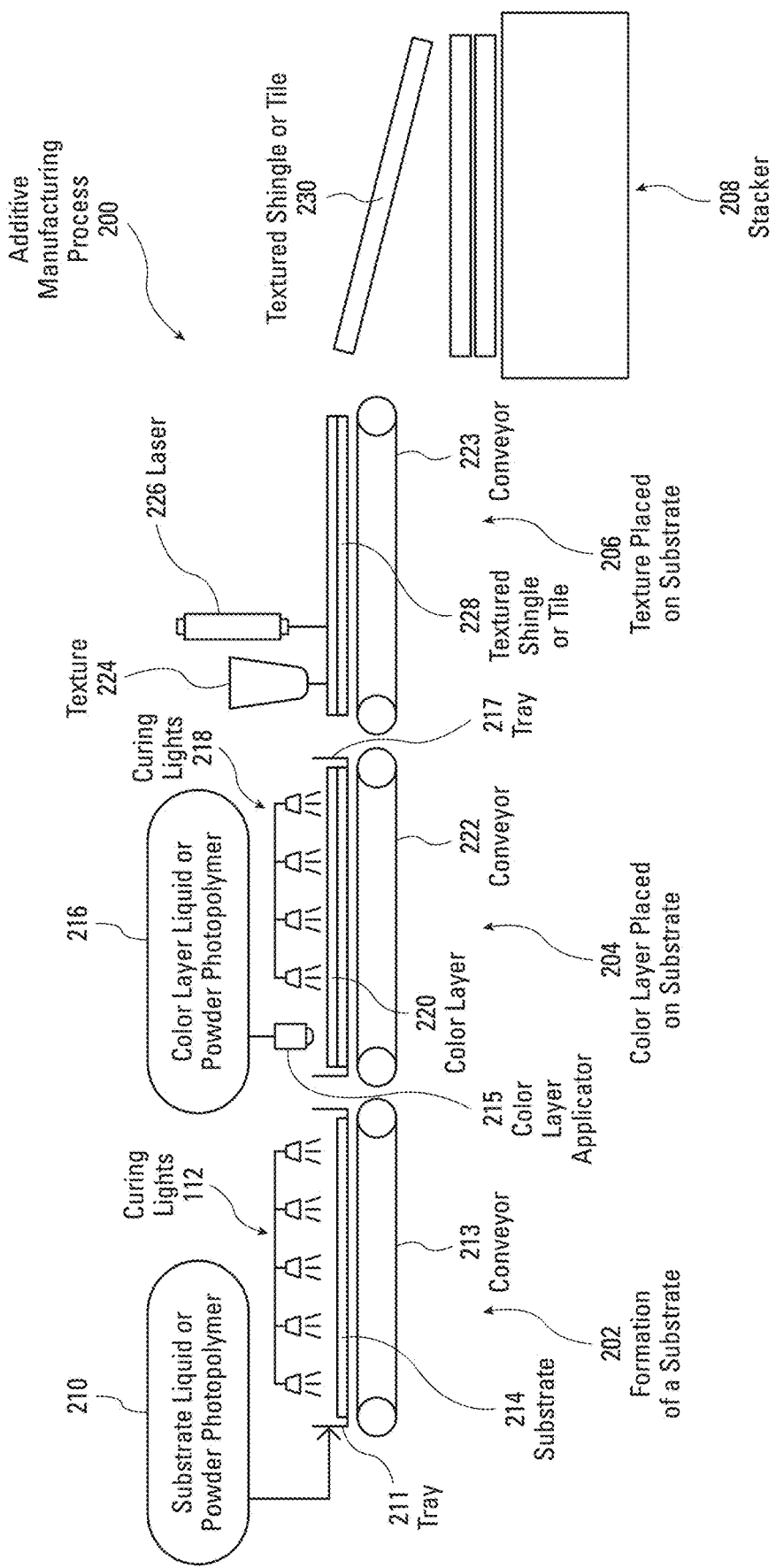
FIG. 3 is another more detailed schematic diagram of the additive manufacturing process illustrated in FIG. 1.

FIG. 3 is a more detailed schematic illustration of an embodiment for making a shingle or tile using an additive manufacturing process 200. As shown in FIG. 3, the additive manufacturing process 200 includes the step 202 of forming a substrate, the step 204 of placing a color layer on the substrate and the step 206 of placing texture on the substrate. Again, a substrate can be provided by a local manufacturing site which would eliminate step 202.

At step 202, a substrate liquid or powder photopolymer, in a container 210, is placed in a tray 211. Curing lights 212 cure the substrate 214 in a rapid manner, in some cases in a matter of seconds. Conveyer 213 then transports the substrate 214 to conveyer 222. The substrate is then placed in a second tray 217. A liquid or powder photopolymer in container 216, is then placed on the substrate 214, using color layer applicator 215 to form color layer 220. The substrate 214 that is covered with color layer 220, is then cured with curing lights 218. If a dye or paint is used, rather than the color photopolymer, different types of lights including heaters and blowers can be used to cure the dye or paint. Once the color layer 220 is cured, the substrate 214, with the color layer 220, is then transported by conveyer 222 to conveyer 223. Texture 224 is then placed on the color layer 220 and laser 226, or another source of light, is used to cure the texture to form a textured shingle or tile 228, 230. Again, the texture can comprise any desired type of three dimensional relief. For example, texture resembling granules having a desired color may be placed on the substrate 214 that includes the color layer to provide a textured shingle or a roof tile.

Figure 4:
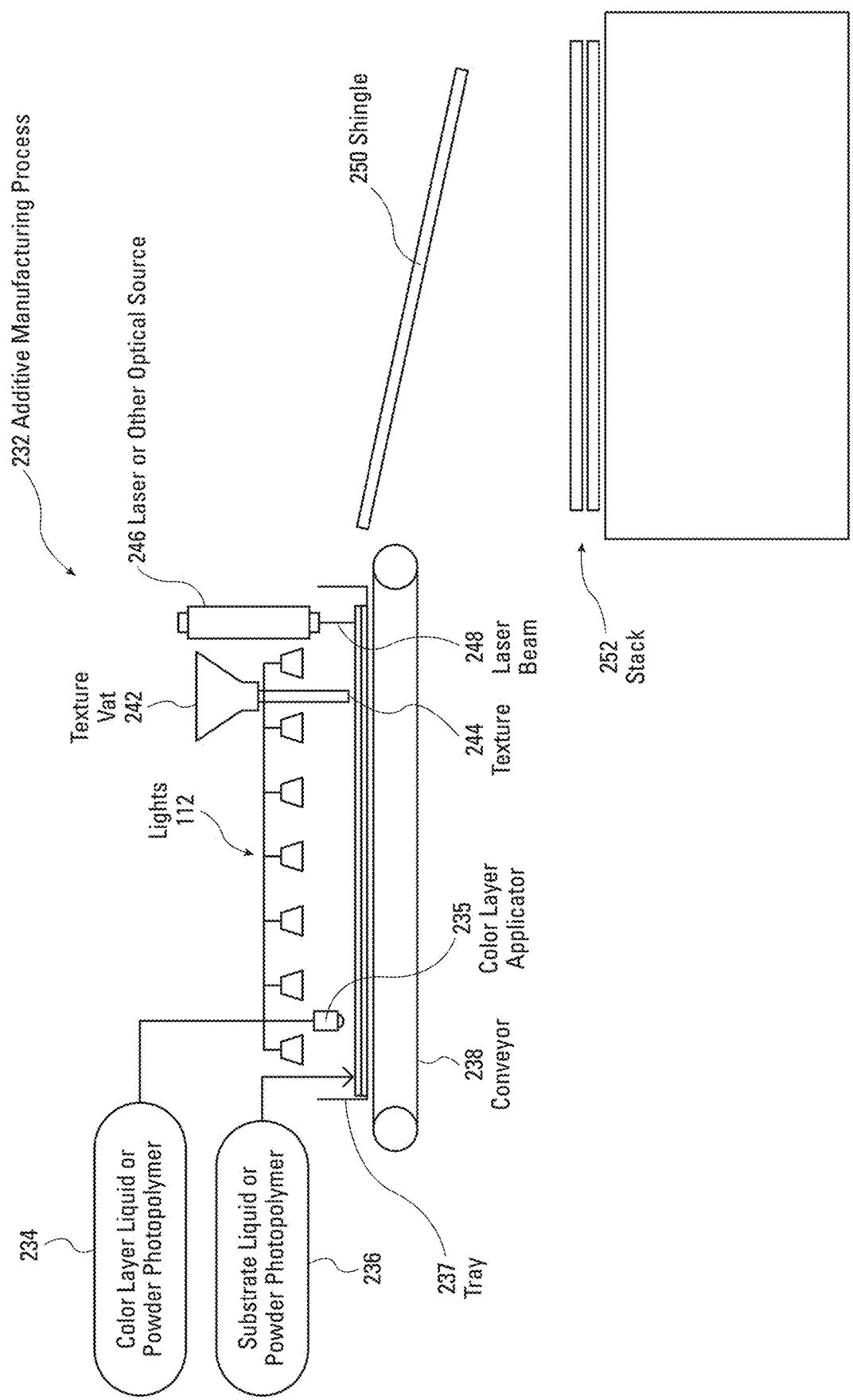
FIG. 4 is another embodiment of an additive manufacturing process for making shingles and roof tiles.

FIG. 4 is a schematic diagram of another embodiment of an additive manufacturing process 232 for making a shingle or roof tile. As illustrated in FIG. 4, a substrate liquid or powder polymer 236 is placed in a tray 237. The tray 237 may have a releasable bottom or may simply constitute a border so that the liquid or powder sits directly on the conveyer 238 and can be raised and lowered as needed. The substrate that is formed from the substrate liquid or powder is cured by lights 240. Alternatively, a substrate can be premanufactured and provided in the manner indicated above.

As also illustrated in FIG. 4, a color layer liquid or powder photopolymer 234, or other paint or dye, can be applied to the substrate using a color layer applicator 235. The color layer applicator 235 can comprise a sprayer, nozzle or other type of applicator that can apply a liquid colorant material or powder that is a polymer, or a dye or paint. The applicator should also be able to apply liquid polymers that are clear or have been colored that do not comprise photopolymers over the entire surface of the substrate. The color layer applicator 215 of FIG. 3 should also be able to perform these functions. In addition, if the embodiment of FIG. 3 or the embodiment of FIG. 4 is used to generate a substrate, a similar type of nozzle may be used to create a layer of photopolymer material or other polymer material to create the substrate 214 of FIG. 3, or the substrate illustrated in FIG. 4. Again, a pre-made substrate may be utilized in either the embodiment of FIG. 3 or the embodiment of FIG. 4, and a color layer added on location to meet the specific color requirements of the customer. In addition, if a paint or dye is used, a separate polymer coating, which may constitute a photopolymer or a polymer that is cured by a hardener, that is clear and can be used to protect the color layer. If a photopolymer is used for the color layer 234, lights 240 can be used to cure the photopolymer. If a paint or dye is used, heating lamps or blowers can be used to cure the dye or paint.

As also illustrated in FIG. 4, after the substrate has been colored, texture 244 in texture vat 242 is applied to the colored substrate. Laser 246 is then used to cure the texture 244 with laser beam 248. Other light sources can also be used to cure the texture. The shingle 250 is then transported by the conveyer 238 to the stack 252.

Consequently, shingles and roof tiles can be fabricated on location which allows for reduced shipping costs, reduced inventory costs, and provides greater variety of colors and shapes of shingles and roof tiles. Substrates can be fabricated on site or can be shipped to the construction location and colored and textured using additive manufacturing techniques. Simple manufacturing devices can be used that can be mounted on a truck for mobile manufacturing of shingles.

What is claimed is:

1. A method of manufacturing custom metal shingles at a local shingle installation site using a metallic wire feed welding additive manufacturing system comprising:
   providing a truck or trailer that is moved to said local shingle installation site and other installation sites;
   providing a plurality of metal blank shingle substrates made at a factory and delivered to said local installation site;
   mounting a wire feed arc welder on said truck or trailer;
   mounting a robotic arm on said wire feed arc welder;
   mounting a welding tip of said wire feed arc welder on said wire feed arc welder;
   controlling the movement of said robotic arm and said welding tip using signals generated by a controller; and
   dispensing wire and welding said wire with said wire feed arc welder to surfaces of said metal blank shingle substrates in accordance with said metallic wire feed welding additive manufacturing system to form a selected relief surface on said surfaces of said metal blank shingle substrates to create a custom metal shingle, said selected relief surface comprising one of a plurality of relief surfaces that are programmed in said controller, to make said metal shingles.

2. The method of claim 1 further comprising:
   painting said metal shingles with a selected paint color, to create a paint covering on said metal shingles;
   drying said paint on said metal shingles;
   coating said paint covering with a durable coating; and
   drying said durable coating.

3. The method of claim 1 further comprising:
   using a galvanized steel wire as said wire that is dispensed by said welding tip.

4. The method of claim 1 further comprising:
   placing said metal shingles in a galvanizing bath.

5. A system for manufacturing metal shingles at a local installation site comprising:
   a mobile platform that can be moved to said local installation site;
   a plurality of metal blank shingle substrates made in a factory and delivered to said local installation site and made available at said local installation site;
   a robotic arm mounted on said mobile platform;
   a wire feed arc welder mounted on said mobile platform;
   a welding tip on said wire feed arc welder that is mounted on said robotic arm that dispenses and welds said wire on a surface of said metal blank shingle substrate to form a relief surface on said metal blank shingle surface; and
   a controller that controls movement of said robotic arm so that said welding tip constructs said relief surface on said metal blank shingle substrate, said relief surface comprising a selected surface contour on said metal blank shingle substrate that is one of a plurality of relief surfaces that are programmed into said controller to make said metal shingles.

6. The system of claim 5 further comprising:
   a galvanizing bath that galvanizes said metal shingles.

7. The system of claim 6 further comprising:
   a painting module that paints said metal shingles a selected color;
   a dryer that dries said paint to create a painted metal shingles;
   a coating module that coats said painted metal shingles with a durable coating; and
   a curing module that cures said coating.

8. A method of making custom shingles and roof tiles on site at a local installation site comprising:
   providing a truck or trailer that is moved to said local installation site where said custom shingles and roof tiles are to be installed;
   providing a plurality of polymer blank shingle or roof tile substrates made at a factory and delivered to said local installation site;
   placing each of said plurality of polymer blank shingle or roof tile substrates in a color applicator;
   coating said polymer blank shingle or roof tile substrates with a desired color coating layer using said color applicator;
   curing said color coating using a color curing device which exposes said color coating to cure said color coating on said polymer blank shingle or roof tile substrate; dispenser to provide a photopolymer relief layer;
   curing said photopolymer relief layer using a photopolymer curing device to cure said photopolymer relief layer to form said custom shingles and roof tiles with a desired color and texture;
   mounting said color applicator, said color curing device, said texture dispenser and said photopolymer curing device on said truck or trailer.

9. A system for making custom shingles or roof tiles on site at a local installation site comprising:
   a truck or trailer that is moved to said local installation site where said shingles or roof tiles are to be installed;
   a plurality of polymer blank shingle or roof tile substrates made at a factory and delivered to said local installation site;
   a color applicator mounted on said truck or trailer that applies a color layer to said polymer blank shingle or roof tile substrates; and
   a source of light or heat mounted on said truck or trailer that irradiates said color layer to cure said entire surface of said color layer;
   a texture applicator mounted on said truck or trailer that coats said polymer blank shingle or roof tile substrate with a polymer relief layer;
   an additional light source mounted on said truck or trailer that cures said photopolymer relief layer to form said custom shingles or roof tiles with a desired color and texture at a local installation site.

* * * * *